United States Patent [19]

Shaw et al.

[11] Patent Number: 4,495,656

[45] Date of Patent: Jan. 22, 1985

[54] FIBER OPTIC WORD GENERATOR

[75] Inventors: Herbert J. Shaw, Stanford; Steven A. Newton, Menlo Park, both of Calif.; John E. Bowers, Milltown, N.J.; Kenneth P. Jackson, Stanford, Calif.

[73] Assignee: Stanford Junior University, Stanford, Calif.

[21] Appl. No.: 417,506

[22] Filed: Sep. 13, 1982

[51] Int. Cl.³ .............................................. H04B 9/00
[52] U.S. Cl. .................................. 455/608; 455/612; 375/24
[58] Field of Search ................. 455/608, 612; 375/11, 375/12, 14, 24; 350/96.15, 96.16

[56] References Cited

U.S. PATENT DOCUMENTS 4,201,942  5/1980  Downer ............................... 375/24

FOREIGN PATENT DOCUMENTS 0048047  3/1982  European Pat. Off. ............ 455/612

OTHER PUBLICATIONS

K. P. Jackson, J. E. Bowers, S. A. Newton, and C. C. Cutler, "Microbend Optical Fiber Tapped Delay Line for Gigahertz Signal Processing," presented at the Topical Meeting on Optical Fiber Communication, Phoenix, Arizona, Apr. 1982.

Primary Examiner—Joseph A. Orsino, Jr.
Assistant Examiner—Timothy K. Greer
Attorney, Agent, or Firm—Knobbe, Martens, Olson & Bear

[57] ABSTRACT

A digital word generator uses a tap fiber optic delay line to generate a sequence of pulses. The pulses are weighted and combined to produce a digital word.

14 Claims, 7 Drawing Figures

FIBER OPTIC WORD GENERATOR

BACKGROUND OF THE INVENTION

This invention relates generally to digital communication systems and particularly to apparatus and methods for generating digital signals. Still more particularly, this invention relates to fiber optic systems for generating digital words for use in digital signal processing systems.

The internal operations of digital computers and signal processing systems are in binary arithmetic. Such systems store and access information in units called words. A typical word size is 32 binary digits, or bits, although word sizes in current use range from 16 to 60 bits.

Realization of the full potential of single mode fiber optic systems in digital communications and data processing systems requires an efficient means of generating digital words and transferring the digital words to other components of the system. It is possible to produce a word generator by digitally weighting the outputs of selected taps of a tapped delay line.

A tapped delay line may be used as a means for generating a precisely timed series of pulses. The precision with which the pulses are timed depends upon the accuracy in locating the taps. In optical fiber, the propagation velocity is so great, being approximately 200,000 km/sec, that if the tap location is known to within 5 mm, the time delay from a specified reference point is known to within 25 ps. While the same is true of electrical delay lines, losses at frequencies of several gigahertz and above are extremely high and dependent upon the modulation frequency, whereas in optical fibers the losses are low and are independent of the modulation frequency.

In communication and control systems, delay lines are used to store signals for predetermined delay time periods and to supply the signals at output points at the end of the delay period. A tapped delay line is a variation of a delay line in which the signal is supplied at several different output points. Tapped delay line applications include use in pulse generators, correlators, and convoluting devices.

There are three basic types of tapped delay lines which may be used in the construction of a digital word generator. The first basic type comprises a group of devices which utilize the reinforcement of waves. The second basic type utilizes a length of transmission medium with the signal being removed at taps separated by equal lengths of the transmission medium. The removed signals may be weighted and summed to provide the desired system output. The third basic type of tapped delay line recirculates the signal to allow the desired fundamental and harmonic frequencies to reinforce themselves.

Acoustic tapped delay devices and coaxial cable delay devices are commonly used in construction of the three basic types of tapped delay lines. Coaxial cable and acoustic devices both have the disadvantages of limited band width, which renders such devices useless both at high carrier frequencies and with short duration signal pulses. At frequencies above 100 mhz, a coaxial cable is subject to losses so severe that high frequencies will not be transmitted accurately. In addition, if the pulse being transmitted is of extremely short duration, such as 1 nanosecond, the pulse will be degraded and will spread out rather than remaining sharply defined. Coaxial cable is also susceptible to electromagnetic interference, particularly when the frequencies being transmitted are relatively high. The main disadvantage of acoustic wave devices is that their upper operational frequency limit is approximately 1 GHz and many applications necessitate word generation systems which are operable at higher frequencies.

The use of an optical fiber tapped delay line in the construction of a word generator has significant advantages in that the optical fiber tapped delay line is not susceptible to electromagnetic interference, is operable at relatively high frequencies, and is substantially less bulky than coaxial cable.

Therefore, there is a need for a fiber optic digital word generator comprising a number of taps capable of removing a signal from a tapped delay line and further comprising means for weighting the outputs to produce a predetermined digital word.

SUMMARY OF THE INVENTION

The present invention provides a digital word generator including a tapped single mode optical fiber delay line. The tapped delay line produces a train of pulses in response to a single input pulse. The delay line may be either a kinked delay line, or a delay line which includes a plurality of couplers formed in substrates having a plurality of parallel v-grooves therein. The digital word generator includes means for weighting the output at each tap so that a pulse input to the tapped delay line results in a predetermined digital word being output from the digital word generating system.

For simplicity the invention is described with reference to devices having four output terminals for outputting signals corresponding to a logic high, 1, or a logic low, 0. Therefore the device outputs 4bit words such as 1111, 1010, 1110, which represent binary numbers.

A digital word generator, according to the invention, may include either internal tap weighting or external tap weighting. Internal tap weighting includes means, such as a piezoelectric actuator, for controlling the radius of curvature of a kink, which forms a tap in a fiber optic strand, to control the optical output of the tap. External weighting includes means, such as a mask or a liquid crystal cell, for controlling the transmission of light emitted at a tap. The invention includes both mechanical and electronic control of the weighting for each output pulse.

The optical fibers in the digital word generator are preferably single mode fibers, which have the advantage of being capable of carrying pulsed signals at 100 GHz with the pulses being distinguishable after traveling a distance of one kilometer.

DESCRIPTION OF THE PREFERRED EMBODIMENT

Figure 1:
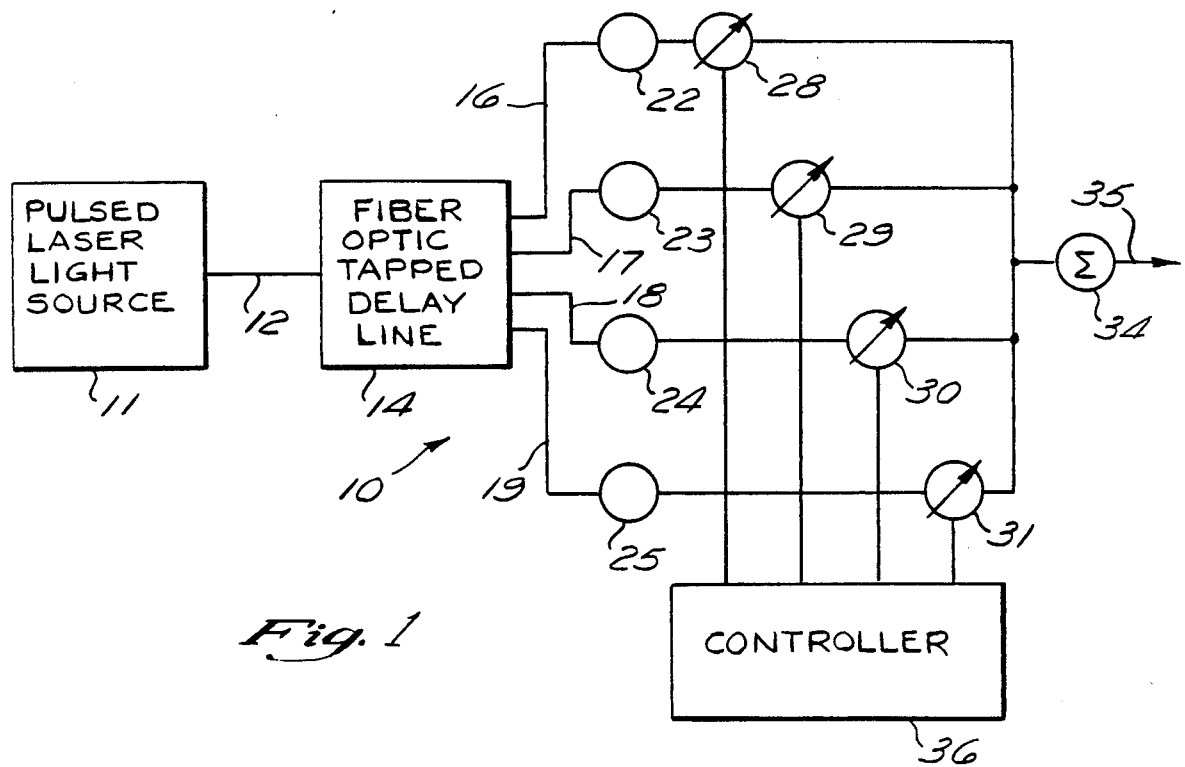
FIG. 1 is a block diagram of a digital word generator according to the invention.

Referring to FIG. 1, a word generator 10 includes a pulsed laser light source 11, which supplies a pulsed optical signal to a fiber optic tapped delay line 14 through a single mode optical fiber 12. The delay line 14 has a plurality of output taps 16-19. FIG. 1 shows the four output taps 16-19 for purposes of illustration only. In actual practice, the tapped delay line may have any desired number of output taps such as the taps 16-19 shown in the drawings.

Each of the output taps 16-19 comprises a single mode optical fiber similar to the optical fiber 12. Output tap 16 supplies an optical signal to a detector 22 which outputs an electrical signal responsive to the optical signal input received from the output tap 16. Similarly, a plurality of detectors 23-25 receive optical signals from the output taps 17-19, respectively and produce signals responsive to the optical signals input thereto.

A weighting device 28 receives the output signal of the detector 22. A controller 36, connected to the weighting device 28, which may be, for example, a keyboard (not shown) or a central processing unit (not shown) provides means for controlling the weight of the output signal of the detector 22. Each of the remaining detectors 23-25 has a corresponding weighting device 29-31, respectively. The weighting devices 29-31 each receive weighting control signals from the controller 36. The weighting devices 28-31 may be either before or after the detectors 22-25, depending upon the specific type of weighting and detecting devices 28-31 and 22-25, respectively used in the word generator 10. The output signals of the weighting devices 28-31 are input to a summing device 34. The summing device 34 combines the output signals of the weighting devices 22-25 and provides a signal to other apparatus such as an optical fiber transmission line 35.

Figure 7:
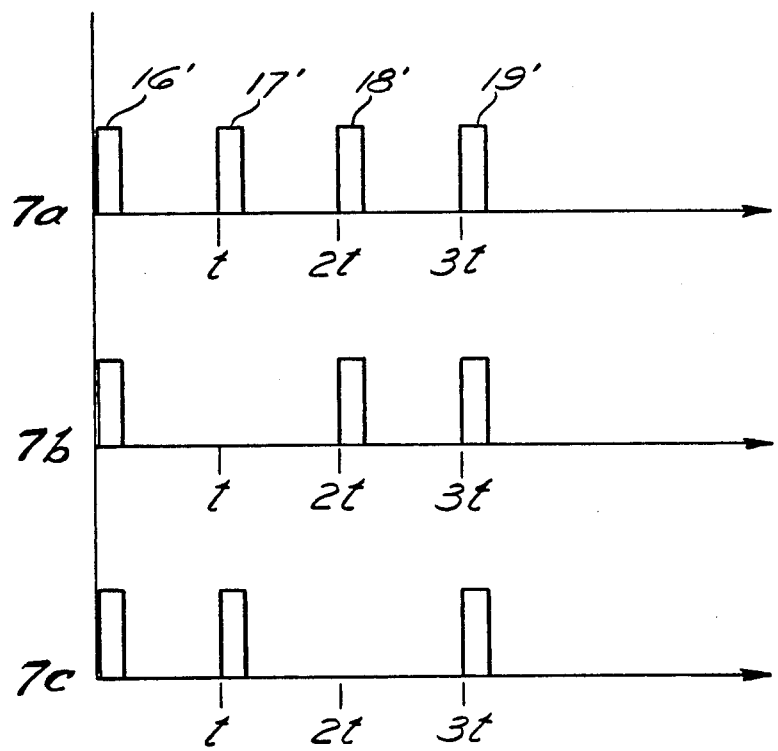
FIGS. 7a-7c illustrate input and output waveforms of the word generator of FIG. 1.

The word generator 10 illustrated in FIG. 1 is capable of generating a 4-bit binary word. If the tapped delay line 14 receives an optical pulse from the laser light source 11, the tapped delay line 14 produces an output pulse in each of the output taps 16-19. Referring to FIG. 7a, a pulse 16' is output by the tap 16, and similarly the outputs of the taps 17, 18 and 19 are the corresponding pulses 17', 18' and 19'. If the tapped delay line is constructed to have uniform lengths of the optical fiber 12 between the taps 16-19, the output of the tapped delay line 14 is the sequence of pulses shown in FIG. 7a where t is the time required for the optical pulse input to the optical fiber 12 to travel the distance between successive taps. If, for example, weighting devices 28, 30 and 31 each give the signals input thereto equal, non zero weight corresponding to a logic high while the weighting device 29 gives zero weight to the signal input thereto, the output of the summing circuit 34 is the train of pulses shown in FIG. 7b, which corresponds to the digital 4-bit word 1011.

Figure 2:
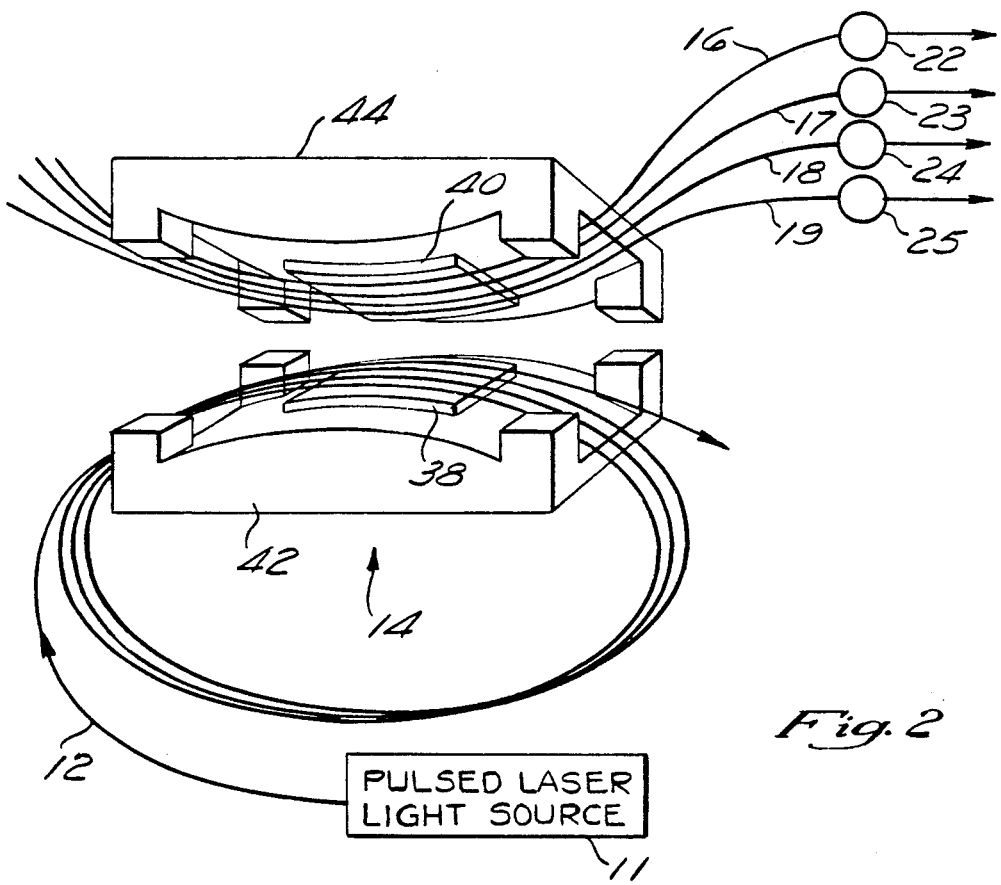
FIG. 2 is an exploded perspective view of a first preferred embodiment of the optical fiber tapped delay line of FIG. 1.

FIG. 2 illustrates a tapped delay line 14 suitable for use in the word generator 10 shown in FIG. 1. The tapped delay line 14 of FIG. 2 is described in detail in U.S. patent application Ser. No. 323,038, filed, Nov. 19, 1981 for Tapped Optical Fiber Delay Line and assigned to the assignee of this invention. The foregoing mentioned U.S. patent application is hereby incorporated by reference.

The optical fiber 12 is wrapped around a chip 38 of a material such as a silicon wafer having a plurality of evenly spaced parallel V-grooves (not shown) therein. The pulsed laser light source 11 is conventionally positioned for inputting optical signals into the optical fiber 12. Optical fibers 16-19 are mounted in V-grooves in a chip 40, which is similar to the chip 38. The chips 38 and 40 are mounted to suitable bases, such as a pair of quartz blocks 42 and 44, respectively. The chips 38 and 40 are faced together so that the optical fibers 16-19 are in alignment and in contact with the coils of the optical fiber 12.

A convenient method of insuring that the optical fibers 16-19 and optical fiber 12 are in alignment is to make the chips 38 and 40 from the same mold. It may be advantageous to wrap a single optical fiber through the grooves in the chip 40 and around the quartz block 44 and to cut the fiber along a selected line along the back of the quartz block 44 to form the separate optical fibers 16-19.

A portion of the cladding is removed from the lengths of the optical fibers 12 and 16-19 which are in contact with the chips 38 and 40 so that evanescent field coupling couples optical signals propagating in the coils of the optical fiber 12 to the portions of the optical fibers 16-19 in the chip 40.

Figure 5:
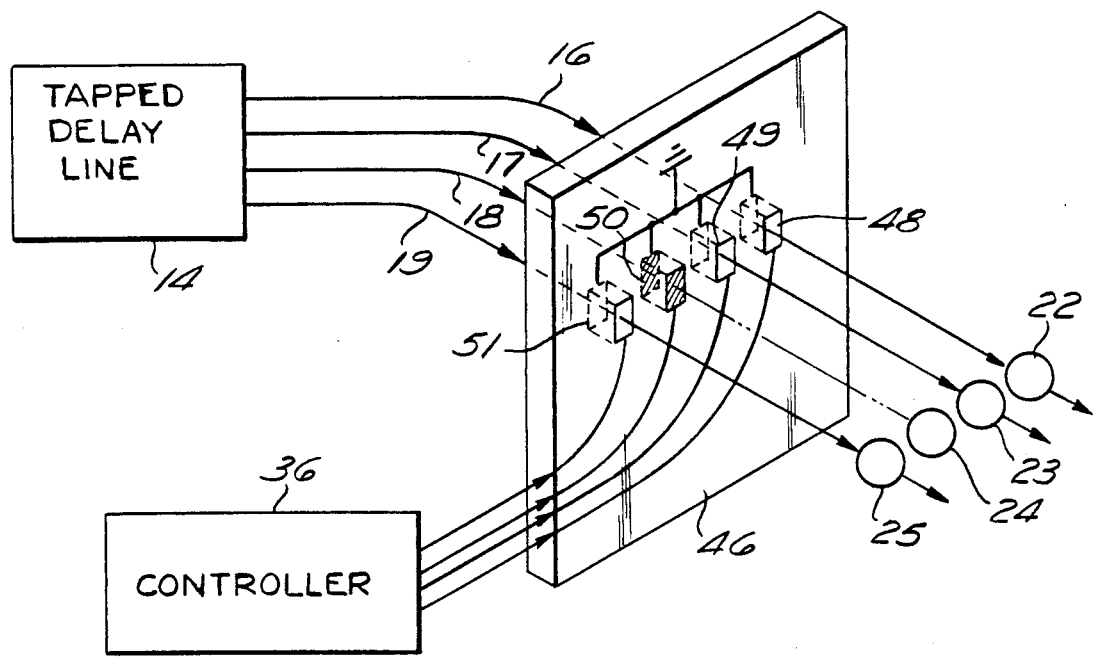
FIG. 5 is a perspective view of a liquid crystal cell used as a tap weighting device.

Referring to FIG. 5, a liquid crystal cell 46 provides means for weighting the optical signals which the tapped delay line 14 outputs at the taps 16-19. The optical output of each of the taps 16-19 is directed at a corresponding electrode 48-51 of the liquid crystal cell 46.

The controller 36 supplies voltage to each of the electrodes 48-51 to control the light-transmitting characteristics thereof. For example, FIG. 5 shows the electrodes 48, 49 and 51 to be transparent while the electrode 50 is opaque. In the embodiment shown in FIG. 5, the detectors 22-25 receive the optical signals output from the electrodes 49-51, which provide means for weighting the output signals of the taps 16-19, respectively. As shown, the detectors 22, 23 and 25 each receive an optical pulse and, accordingly, output corresponding signals which may be electrical or optical. The electrode 50 is shown to be opaque so that no optical signal from the tap 18 reaches the detector 24. Therefore, the output of the summing device 34 in response to a single pulse input to the tapped delay line 14 corresponds to the train of pulses of FIG. 7c, which represents the 4-bit digital word 1101.

Figure 6:
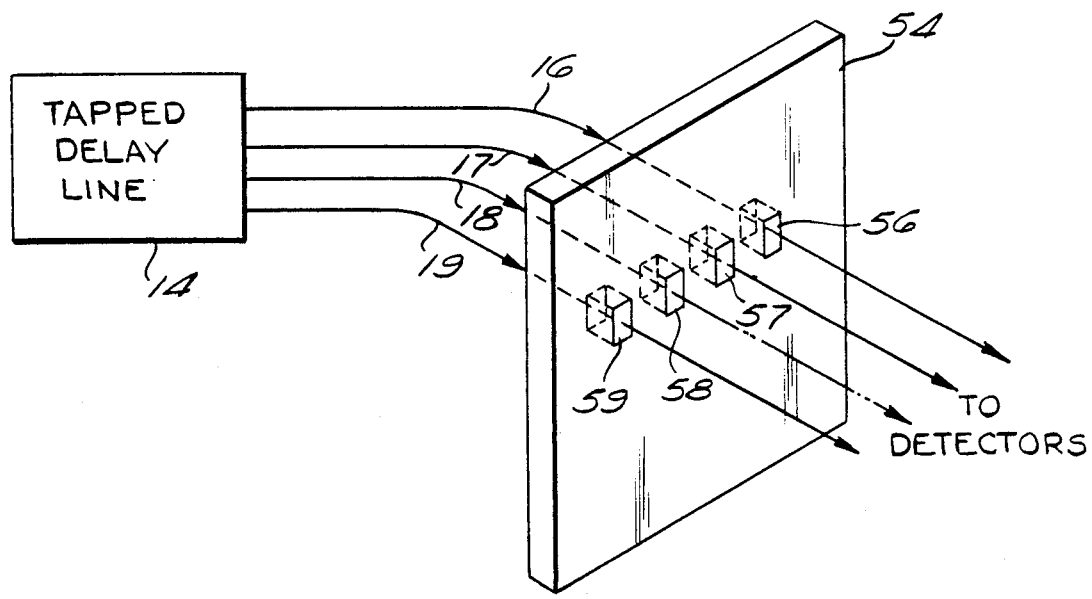
FIG. 6 is a perspective view illustrating the use of a mask to weight the outputs of a tapped delay line.

Referring to FIG. 6, a transmission mask 54 placed in the optical paths of the light output by the taps 16-19 provides mechanical means for digitally weighting the output signals of the taps 16-19. The transmission mask 54 has a plurality of passages 56-59 therethrough arranged in a predetermined pattern to produce optical signals which correspond to a digital word. The illustrated embodiment outputs the digital word 1111 to the detectors 22-25 of FIG. 1. Replacing the transmission mask 54 with other masks (not shown), permits the generation of any desired word.

Figure 3:
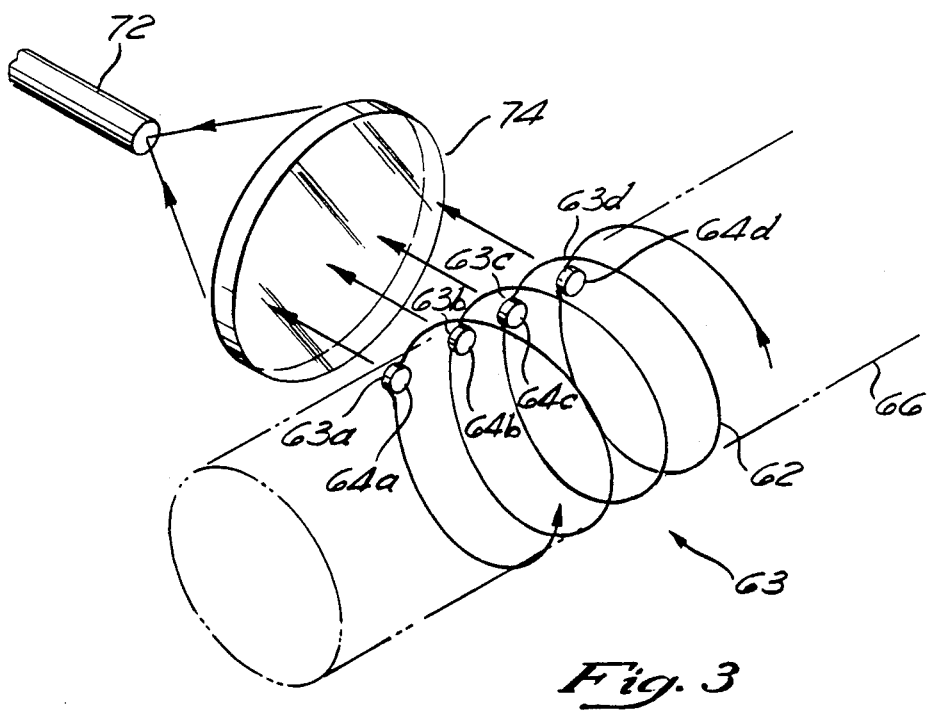
FIG. 3 is a perspective view of a second preferred embodiment of the optical fiber tapped delay line of FIG. 1.
Figure 4:
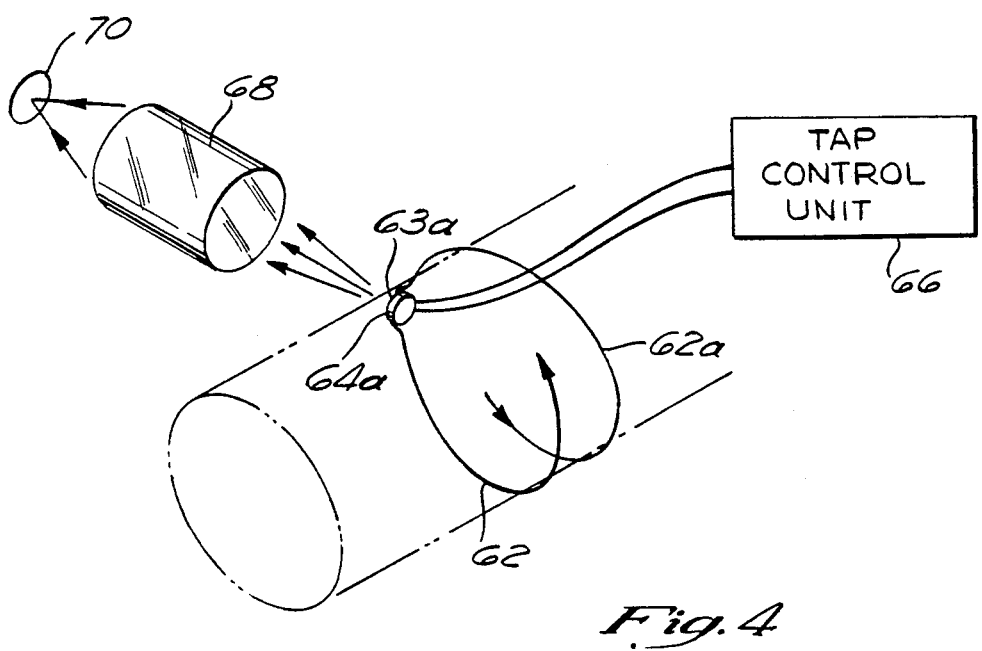
FIG. 4 is a perspective view illustrating the device of FIG. 3 used with a tap control unit and a detector system.

FIGS. 3 and 4 illustrate the use of a kinked optical fiber 62 to form a tapped delay line 63 suitable for use in the circuit of FIG. 1. U.S. patent application Ser. No. 323,037 filed Nov. 19, 1981 for Microbend Optical Fiber Tapped Delay Line describes the structure and theory of operation of a kinked optical fiber delay line.

U.S. patent application Ser. No. 323,037 is assigned to the assignee of the present invention and is hereby incorporated by reference. The optical fiber 62 is wound around a generally cylindrical form 66 with each coil 62a through 62d passing over a corresponding actuator 64a through 64d, respectively, with each of the actuators 64a through 64d being connected to a tap control unit 66. The actuators 64a through 64d may each be any suitable actuator such as a piezoelectric actuator, which is capable of being electrically controlled. The portions of the coils 62a through 62d which pass over the actuators 64a through 64d may function as optical taps 63a through 63d, depending upon the tensions which the actuators 64a through 64d apply to the coils 62a through 62d, respectively.

If the radius of curvature of a portion of the single mode optical fiber 62 is sufficiently small, a portion of the light propagating in the fiber 62 is emitted, or tapped, from the fiber 62. The amount of light tapped from the fiber 62 depends upon the radius of curvature in the portion of the fiber 62 at the locations of the taps 63a through 63d. The tap control unit 66, which may be any suitable control means, such as a central processing unit (not shown) or a keyboard (not shown) for example, sends tap control signals to the actuators 64a through 64d to control the radius of curvature in each of the coils 62a through 62d at the tap location 63a through 63d.

FIG. 4 illustrates the actuator 64a causing the tap location 63a to output light. A lens 68, which is preferably a cylindrical lens, focuses a portion of the light output at the tap location 63a onto a detector 70, which is similar to the detectors 22-25. It is to be understood that each of the other tap locations 63b, 63c and 63d may have similar lenses (not shown) and detectors (not shown) associated therewith for receiving and processing signals output at the taps 63b, 63c and 63d.

Referring again to FIG. 3, the invention may be used to input digital words into an optical fiber transmission line 72. A lens 74 focuses light output by the taps 63a through 63d on a polished end of the optical fiber transmission line 72. The lens 74 optically sums the pulsed output signals of the taps 63a through 63d so that the signal input to the transmission line 72 is a digital word.

What is claimed is:
1. A method for generating a digital word comprising the steps of:
   introducing a pulsed optical signal into a tapped fiber optics delay line in which a portion of each pulse of the pulsed optical signal is removed from the fiber at each of a plurality if taps on the fiber to produce a sequence of optical pulses;
   detecting the optical pulses;
   digitally weighting each optical pulse to produce a sequence of digital logic signals; and
   combining the sequence of digital logic signals to produce a binary word.
2. A fiber optic digital word generator comprising:
   a fiber optic delay line having a plurality of tap points at which a portion of an optical signal propagating through the delay line can be removed from the delay line;
   an optical signal source for introducing an optical signal into the fiber delay line to commence the generation of each digital word;
   a plurality of optical taps, each adapted to remove a portion of the signal propagating through the delay line at one of the delay line tap points, wherein the output of each optical tap is an optical pulse;
   weighting apparatus coupled to at least some of the taps for digitally weighting the pulses output from those taps; and
   a summer for combining the output pulses from each of the optical taps to produce a sequence of pulses forming a digital word.
3. A fiber optic digital word generator, comprising:
   a fiber optic delay line;
   means for introducing a pulsed optical signal input into said fiber optic delay line;
   a plurality of tap means for removing portions of signals propagating in said fiber optic delay line, the output of said tap means being a sequence of pulsed signals;
   means for digitally weighting the pulsed signal output of selected tap means; and
   means for generating a binary word from the weighted output of said tap means.
4. A fiber optic digital word generator according to claim 3 wherein said weighting means comprises a liquid crystal cell with an electrode of said liquid crystal cell corresponding to each said tap means for controlling transmission of optical signals therefrom.
5. A fiber optic digital word generator according to claim 3 wherein said weighting means comprises a transmission mask for controlling transmission of optical signals from said tap means.
6. A fiber optic digital word generator according to claim 3 further including:
   detector means for producing signals in response to the output of said tap means.
7. A fiber optic digital word generator according to claim 6, wherein:
   said means for digitally weighting the pulsed signal output of selected tap means includes means for selectively converting the signals output from said detector means into either a digital logic low signal or a digital logic high signal; and
   said means for generating a binary word includes means for combining the signals output from said converting means to produce a binary word.
8. A fiber optic digital word generator according to claim 3 wherein said tapped delay line comprises a single mode optical fiber.
9. A fiber optic digital word generator according to claim 3 or 8 wherein said generating means includes a summing circuit for summing the weighted output of said tap means.
10. A fiber optic digital word generator according to claim 9 wherein said tap means comprises a plurality of fiber optic couplers.
11. A fiber optic digital word generator according to claim 10 wherein said plurality of fiber optic couplers further comprises:
   a single strand of fiber optic material formed in a coil; and
   an array of separate strands of fiber optic material in proximity to the coils of said single fiber optic strand so that optical signals propagating in said single strand of fiber optic material are coupled to said separate strands of fiber optic materials.
12. A fiber optic digital word generator according to claim 10 wherein said tap means comprises:
   a single strand of fiber optic material formed into a plurality of coils, each of said coils having a tap location; and means for selectively applying a tensile force at each said tap location to control emission of light therefrom.

13. A fiber optic digital word generator according to claim 12 wherein said means for selectively applying a tensile force at said tap locations includes:
   an electrically controlled actuator placed adjacent each said tap location; and
   a tap control unit for selectively applying tap control signals to each said actuator to control the tension which each said actuator applies to said tap location.

14. A fiber optic digital word generator according to claim 13 further including:
   lens means for collecting and focusing light emitted from said tap locations; and
   detector means for detecting light output by said lens means and for producing an electrical signal in response to light output by said lens means.

* * * * *